(12) United States Patent
Anderson et al.

(10) Patent No.: US 12,330,560 B2
(45) Date of Patent: Jun. 17, 2025

(54) REARVIEW MIRROR ASSEMBLY

(71) Applicant: GENTEX CORPORATION, Zeeland, MI (US)

(72) Inventors: Kasen Keith Anderson, Jenison, MI (US); Steven J. Veenman, Hudsonville, MI (US); Brett C. Pothoof, Holland, MI (US); Richard T. Fish, Jr., Hudsonville, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/375,607

(22) Filed: Oct. 2, 2023

(65) Prior Publication Data

US 2024/0109492 A1    Apr. 4, 2024

Related U.S. Application Data

(60) Provisional application No. 63/378,118, filed on Oct. 3, 2022.

(51) Int. Cl.
| | |
|---|---|
| *B60R 1/12* | (2006.01) |
| *B60R 1/04* | (2006.01) |
| *F21V 5/00* | (2018.01) |
| *F21V 23/04* | (2006.01) |

(52) U.S. Cl.
CPC ............. *B60R 1/1207* (2013.01); *B60R 1/04* (2013.01); *F21V 5/00* (2013.01); *F21V 23/0478* (2013.01); *B60R 2001/1223* (2013.01)

(58) Field of Classification Search
CPC ..... B60R 1/12; B60R 2001/1253; B60R 1/04; B60R 11/04; B60R 2011/0033; B60Q 3/258
See application file for complete search history.

(56) References Cited

U.S. PATENT DOCUMENTS

| | | | |
|---|---|---|---|
| 5,928,572 A | 7/1999 | Tonar et al. | |
| 5,998,617 A | 12/1999 | Srinivasa et al. | |
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,249,369 B1 | 6/2001 | Theiste et al. | |
| 6,519,072 B2 | 2/2003 | Nishikitani et al. | |
| 9,505,349 B2 | 11/2016 | Fish, Jr. et al. | |
| 10,739,591 B2 | 8/2020 | Lee et al. | |

(Continued)

FOREIGN PATENT DOCUMENTS

| | | |
|---|---|---|
| EP | 3126935 B1 | 6/2018 |
| JP | 3086058 U | 3/2002 |

(Continued)

*Primary Examiner* — William J Carter
(74) *Attorney, Agent, or Firm* — Price Heneveld LLP; Brian James Brewer

(57) ABSTRACT

A rearview mirror assembly that includes a housing and a printed circuit board (PCB) located in the housing. The rearview mirror assembly further includes a monitoring system that includes an image capturing module, an illumination source connected to the PCB, and an optical element aligned with the illumination source. The optical element is configured to redirect an illumination from the illumination source toward an occupant position in an automobile.

18 Claims, 17 Drawing Sheets

(56) References Cited

U.S. PATENT DOCUMENTS

| | | | |
|---|---|---|---|
| 11,639,134 B1* | 5/2023 | Huizen | B60R 1/04 348/77 |
| 2009/0096937 A1* | 4/2009 | Bauer | B60R 1/12 348/739 |
| 2022/0250547 A1 | 8/2022 | Hong et al. | |
| 2023/0302994 A1* | 9/2023 | Miller | B60Q 3/258 |

FOREIGN PATENT DOCUMENTS

| | | |
|---|---|---|
| KR | 1020220044950 A | 4/2022 |
| KR | 102414041 B1 | 6/2022 |
| WO | 9842796 A1 | 10/1998 |
| WO | 9902621 A1 | 1/1999 |

\* cited by examiner

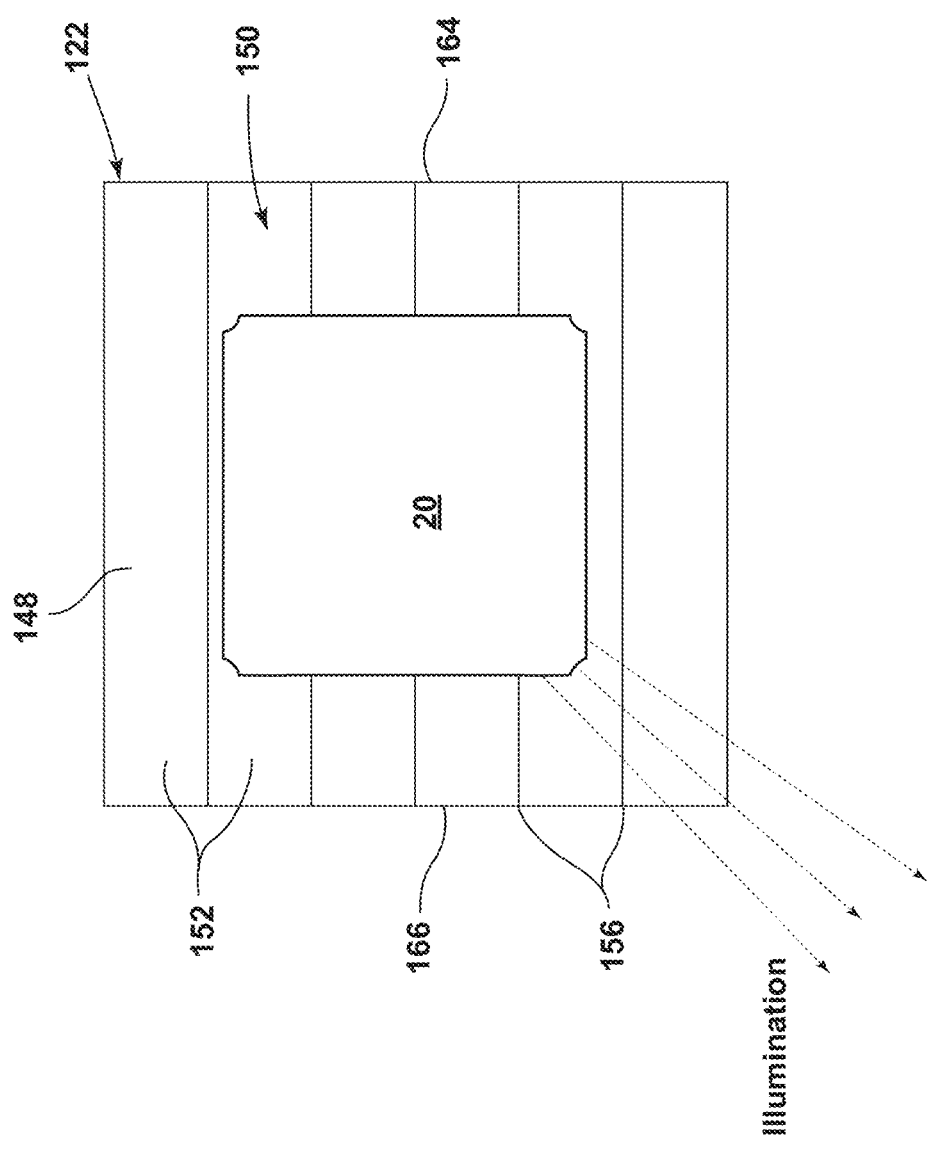

REARVIEW MIRROR ASSEMBLY

CROSS-REFERENCE TO RELATED APPLICATION

This application claims priority to and the benefit under 35 U.S.C. § 119(e) of U.S. Provisional Application No. 63/378,118, filed on Oct. 3, 2022, entitled "REARVIEW MIRROR ASSEMBLY," the disclosure of which is hereby incorporated herein by reference in its entirety.

FIELD OF THE DISCLOSURE

The present disclosure generally relates to a rearview mirror assembly and, more particularly, to a rearview mirror assembly with a driver monitoring system that includes an optical element for redirecting and spreading an illumination.

SUMMARY OF THE DISCLOSURE

According to one aspect of the present disclosure, a rearview mirror assembly includes a housing and a printed circuit board (PCB) located in the housing. The rearview mirror assembly further includes a monitoring system that includes an image capturing module, an illumination source connected to the PCB, and an optical element aligned with the illumination source. The optical element is configured to redirect and spread an illumination from the illumination source toward an occupant position in an automobile.

According to another aspect of the present disclosure, a rearview mirror assembly includes a housing and a printed circuit board (PCB) located in the housing. The rearview mirror assembly further includes a monitoring system that includes an image capturing module, an illumination source connected to the PCB, and an optical element aligned with the illumination source that includes a plurality of wedges each extending to an apex. The plurality of wedges is configured to redirect and spread an illumination from the illumination source toward an occupant position in an automobile.

According to another aspect of the present disclosure, a rearview mirror assembly includes a housing, a transmission element at least partially located in the housing, and a printed circuit board (PCB) located in the housing. The rearview mirror assembly further includes a monitoring system that includes an image capturing module, an illumination source connected to the PCB, and an optical element aligned with the illumination source that includes a plurality of wedges each extending to an apex. The plurality of wedges is configured to redirect and spread an illumination from the illumination source toward an occupant position in an automobile.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 5B is a rear view of an illumination source and an optical element with a second construction that redirects and spreads illumination from the illumination source, in accordance with one aspect of the present disclosure;

DETAILED DESCRIPTION

Figure 1:
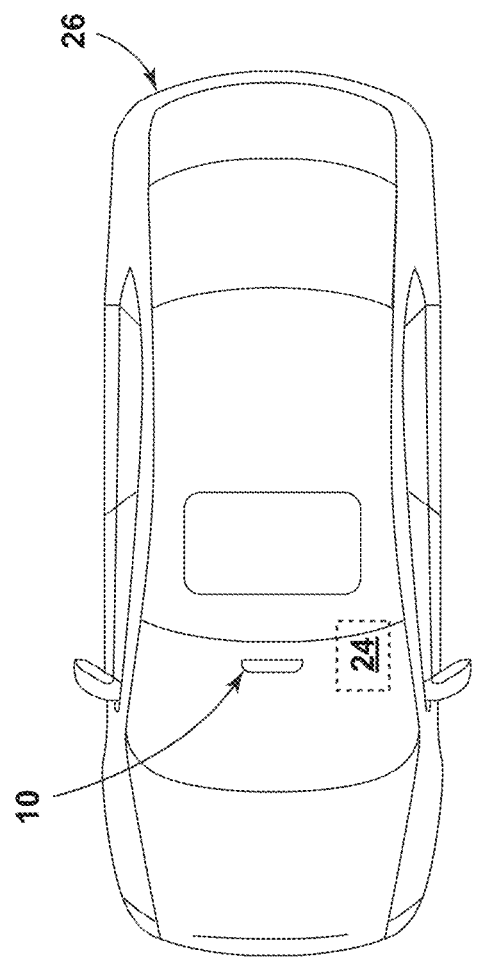
FIG. 1 is a top perspective view of an automobile that incorporates a rearview mirror assembly, in accordance with one aspect of the present disclosure.

The present illustrated embodiments reside primarily in combinations of method steps and apparatus components related to a rearview mirror assembly with a driver monitoring system that includes an optical element for redirecting and spreading an illumination. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented behind the rearview mirror assembly. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-6B, reference numeral 10 generally designates a rearview mirror assembly. The rearview mirror assembly 10 includes a housing 12 and a printed circuit board 14 (PCB) located in the housing. The rearview mirror assembly 10 further includes a monitoring system 16 that includes an image capturing module 18 (e.g., a camera), an illumination source 20 connected to the PCB 14, and an optical element 22 coupled to the PCB 14 and aligned with the illumination source 20. The optical element 22 is configured to redirect and spread an illumination from the illumination source 20 toward an occupant position 24 (e.g., a driver position) in an automobile 26.

With reference to FIG. 1, various embodiments of rearview mirror assembly 10 may be incorporated with one or more structures. For example, a traditional rearview mirror location in the automobile 26 may employ the rearview mirror assembly 10. In other embodiments, components of the rearview mirror assembly 10 may be incorporated in an emergency vehicle, a residential vehicle, an airplane, a rail vehicle, or the like. In some embodiments, the rearview mirror assembly 10 may not include a reflective element and instead operate as a dimmable display. Generally speaking, the rearview mirror assembly 10 may be incorporated into any environment wherein monitoring the occupant position 24 may be beneficial.

Figure 2:
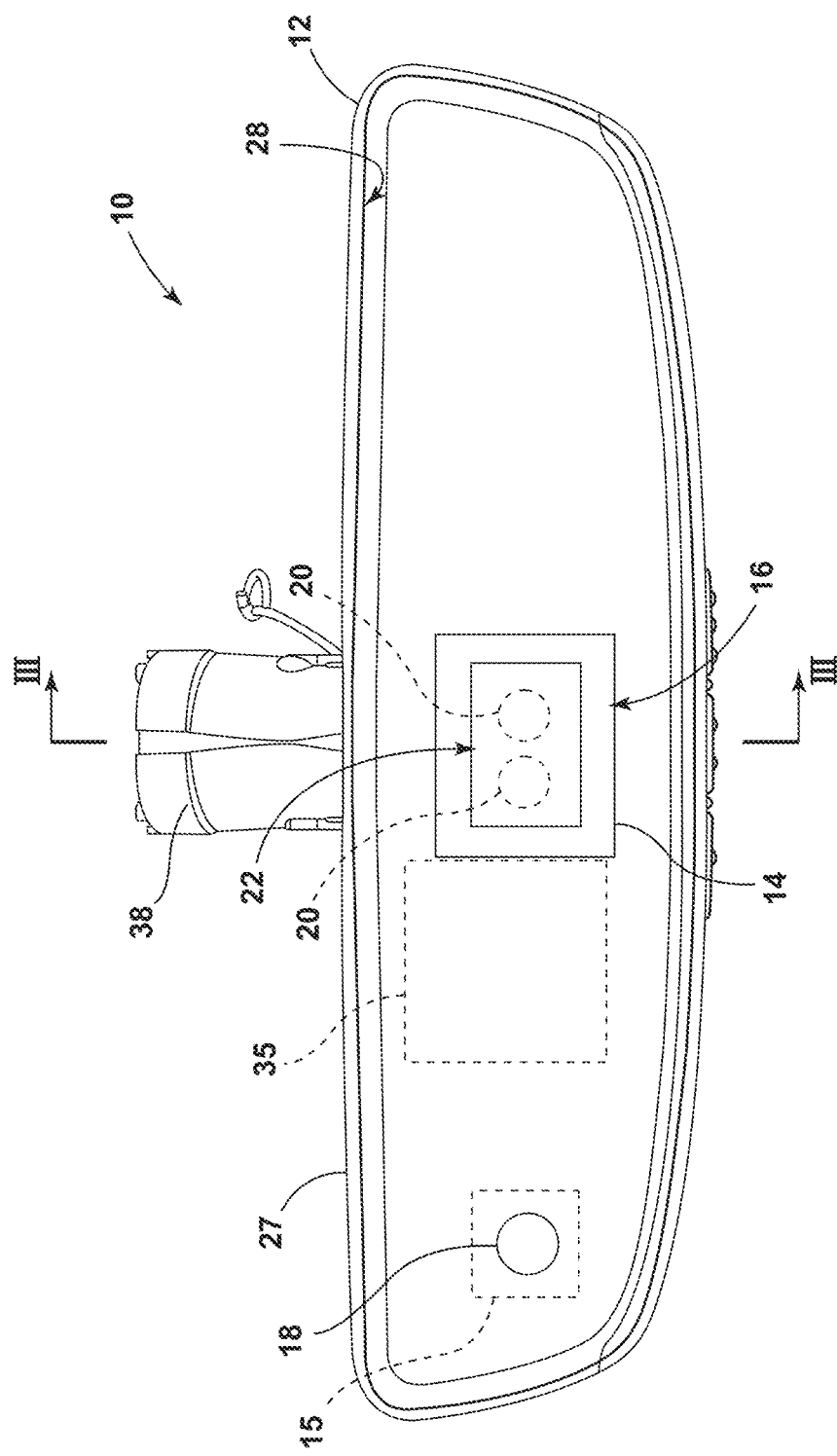
FIG. 2 is a front view of a rearview mirror assembly, in accordance with one aspect of the present disclosure.
Figure 3A:
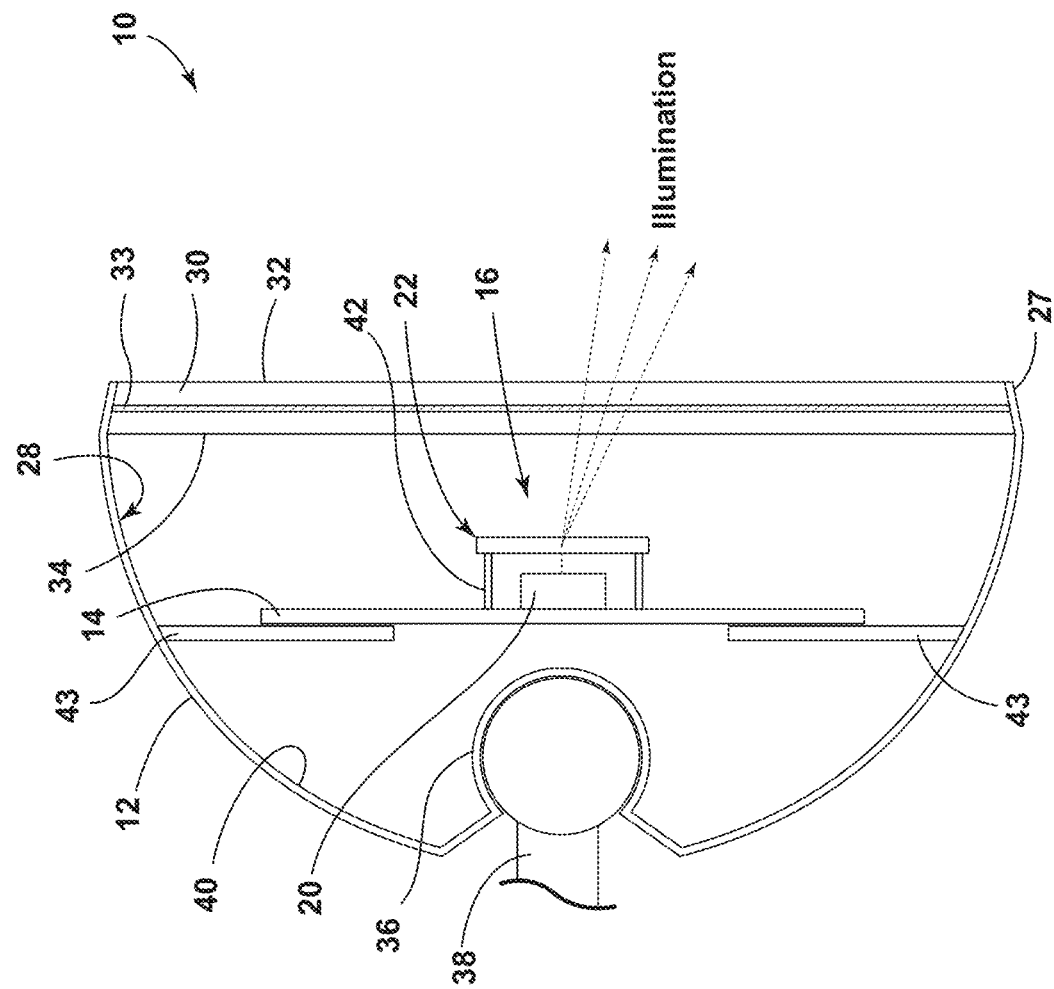
FIG. 3A is a cross-sectional side view of a rearview mirror assembly with an illumination source and an optical element in a first arrangement, in accordance with one aspect of the present disclosure.

With reference to FIGS. 2 and 3A, the housing 12 of the rearview mirror assembly 10 includes a bezel 27 that defines an opening 28 and a transmission element 30 (FIG. 3A) is located in the opening 28. The transmission element 30 includes a front surface 32 that faces the occupant position 24 and a rear surface 34 that generally faces away from the occupant position 24 (FIG. 3A). The transmission element 30 may be configured and/or otherwise coupled to an electro-optic device containing an electro-optic medium 33. As such, the transmission element 30 can be switched between a reflective state, wherein the electro-optic medium 33 is in a transmissive state and the rearview mirror assembly 10 operates as a mirror and a darkened state wherein the electro-optic medium 33 has a reduced optical transmission (e.g., to reduce glare). A reflective layer (not shown) may be located between the housing 12 and the transmission element 30 to reflect light in the reflective state. More particularly, the reflective layer may be located between a substrate that defines the rear surface 34 and the electro-optic medium 33. A display device 35 may be located between the housing 12 and the electro-optic medium 33 for displaying information to a driver from the monitoring system 16. A reflection rate of the transmission element 30 may be consistently lower in front of the display device 35. The electro-optic device and electro-optic medium 33 as disclosed herein may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process for the Preparation Thereof and Use in Electrochromic Devices," and U.S. Pat. No. 6,519,072 entitled "Electrochromic Device"; and International Patent Application Publication Nos. WO 98/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer System," which are herein incorporated by reference in their entirety. The present disclosure may also be used with a display mirror system, such as that described in U.S. Pat. Nos. 9,505,349 and 10,739,591, which are hereby incorporated herein by reference in their entireties.

With continued reference to FIGS. 2 and 3A, the PCB 14 may include a plurality of PCBs 14 or a single PCB 14. For example, the features of the transmission element 30 and the monitoring system 16 may operate from the PCB 14 and the image capturing module 18 may operate from a separate PCB (e.g., second PCB 15). The PCBs 14 and 15 may be located in the housing 12 and completely encased by a combination of the housing 12 and the transmission element 30. The housing 12 may include a connection hub 36 and the connection hub 36 may be connected to a mounting member 38. The mounting member 38 is configured to be connected to the automobile 26 (or other environment) and the housing 12 is moveable relative to the mounting member 38 to orient the transmission element 30 at various angles relative to an occupant position 24 (or other environmental position) to obtain different environmental views and/or orientations relative to a vehicle operator. The PCBs 14 and 15 may be connected with an interior 40 of the housing 12 and moves with the housing 12 as it is adjusted relative to the mounting member 38. In some embodiments, a carrier element 43 may connect one or both of the PCBs 14, 15 to the housing 12. In some embodiments, the carrier element 43 may also connect the transmission element 30 to the housing 12. The image capturing module 18, the illumination source 20, and the optical element 22 may, likewise, move with the housing 12 as it is adjusted relative to the mounting member 38. In some embodiments, the illumination element 20 and PCB 14 are located on an opposite side (e.g., left or right) of the connection hub 36 than the image capturing module 18 and second PCB 15. In some embodiments, the image capturing module 18 may be located outside of the housing 12. In still other embodiments, and as illustrated in FIG. 2, the illumination source 20 and optical element 22 may be aligned in a center of the transmission element 30 (e.g., aligned with the connection hub 36). In this manner, the optical element 22 may be switched (e.g., rotated 180) during manufacture to redirect light for left and right driver side monitoring. Further, the image capturing module 18 may be located towards a right or left side of the optical element 22.

Figure 3B:
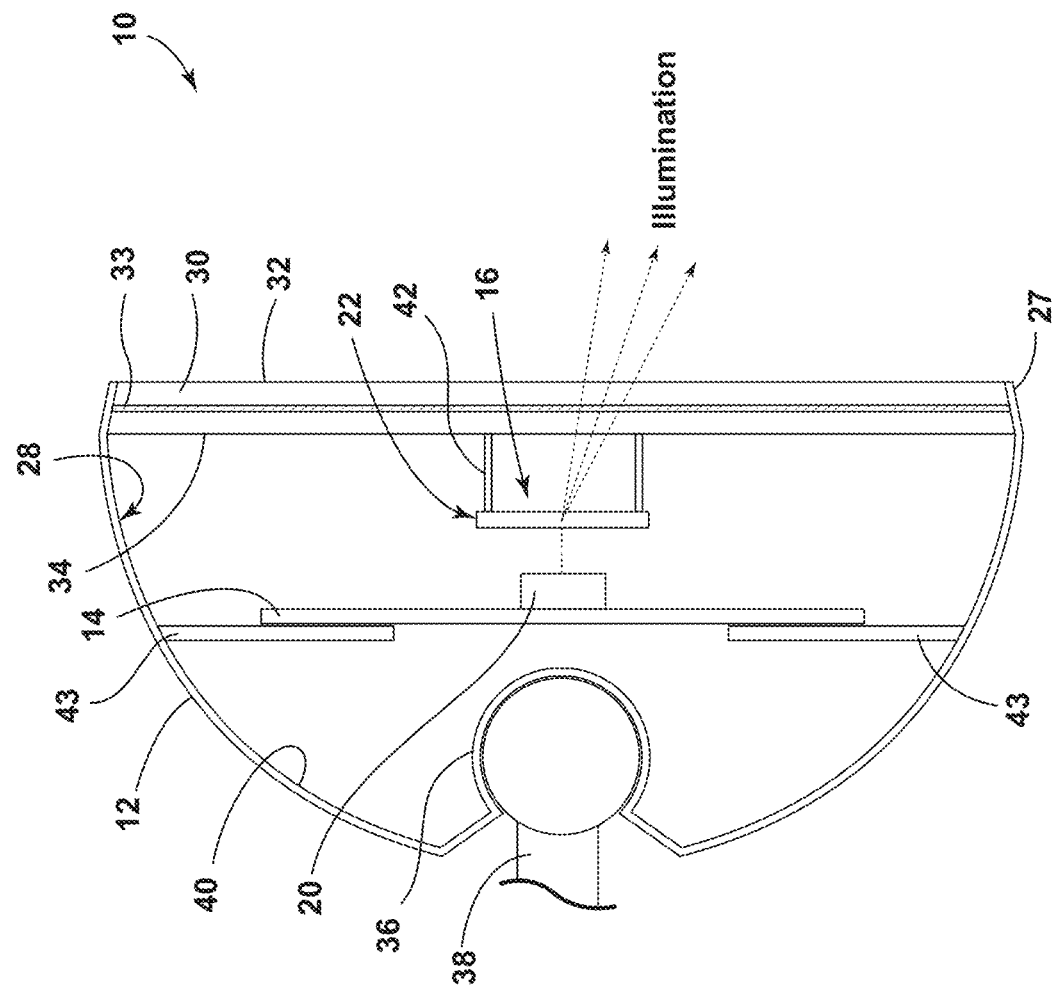
FIG. 3B is a cross-sectional side view of a rearview mirror assembly with an illumination source and an optical element in a second arrangement, in accordance with one aspect of the present disclosure.

With reference now to FIG. 3A, the illumination source 20 may be directly connected with the PCB 14 and the optical element 22 may be held in a spaced relationship from the illumination source 20 with a connection body 42. For example, the connection body 42 may be configured as pins (e.g., one or more), as clips, and/or one or more of the carrier elements 43 that connect the PCB 14 to the housing 12. The connection body 42 may be directly connected to the optical element 22 and extend to and be directly connected with at least one of the PCBs 14, the illumination source 20, the carrier elements 43, the housing 12, or the transmission element 30 (FIG. 3B). The optical element 22 may include an outer perimeter and the connection body 42 may connect to the outer perimeter or internal thereto. For example, in some embodiments, the optical element 22 may include apertures adjacent to the outer perimeter for receiving the connection body 42. In some embodiments, the connection body 42 may be connected to the optical element 22 by other means, for example, adhesive, clips, and/or the like. The connection body 42 may connect to the PCB 14 and/or the illumination source 20 with similar means as it connects to the optical element 22.

Figure 3C:
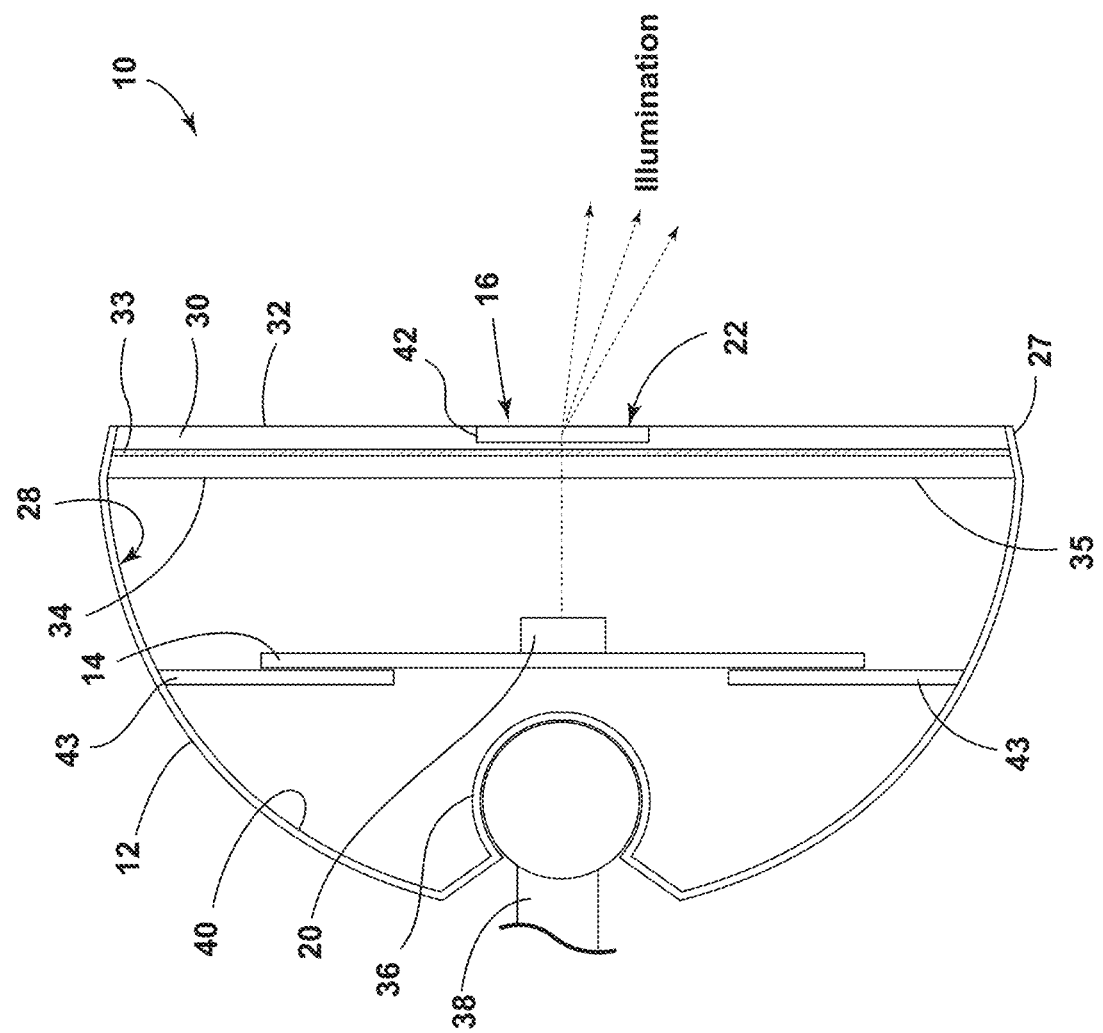
FIG. 3C is a cross-sectional side view of a rearview mirror assembly with an illumination source and an optical element in a third arrangement, in accordance with one aspect of the present disclosure.
Figure 3D:
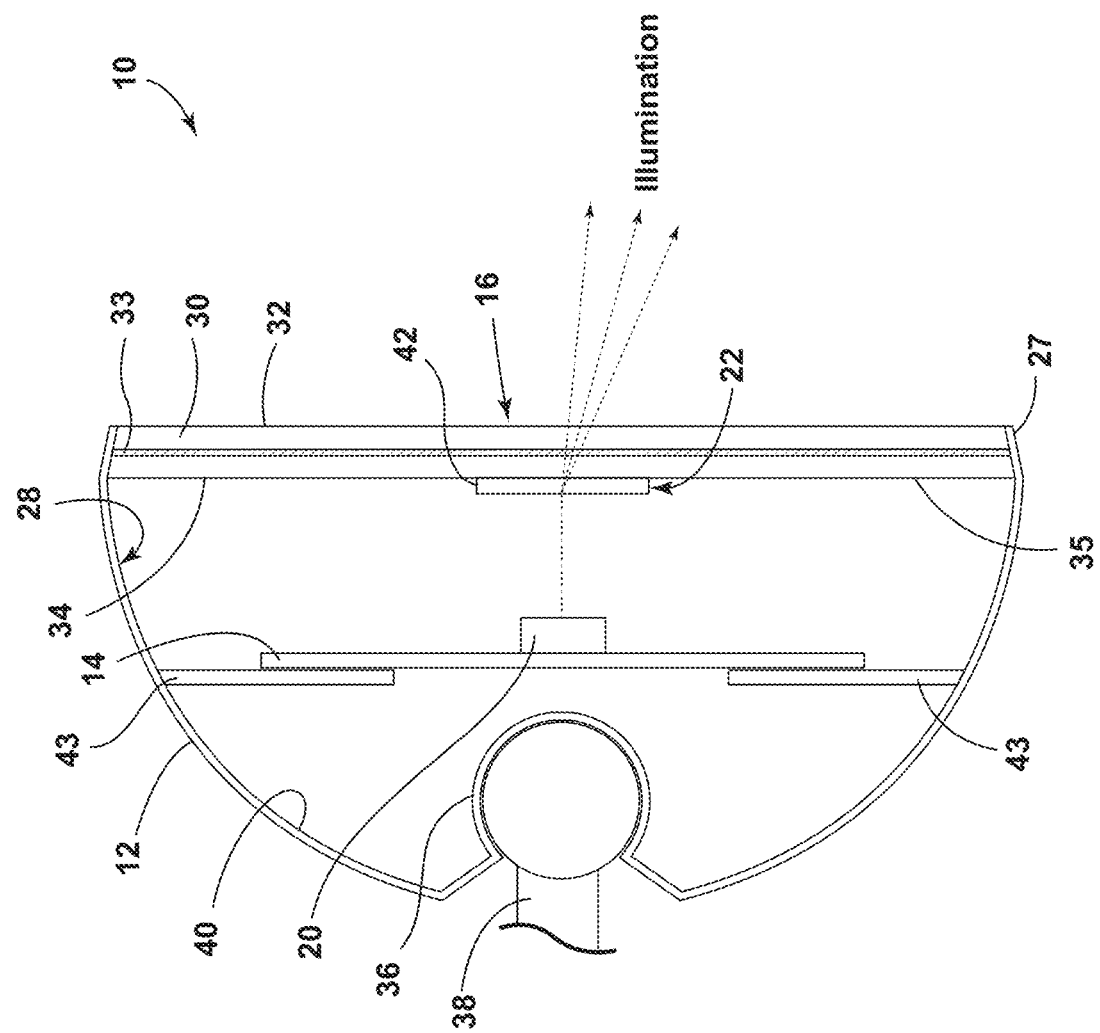
FIG. 3D is a cross-sectional side view of a rearview mirror assembly with an illumination source and an optical element in a fourth arrangement, in accordance with one aspect of the present disclosure.
Figure 3E:
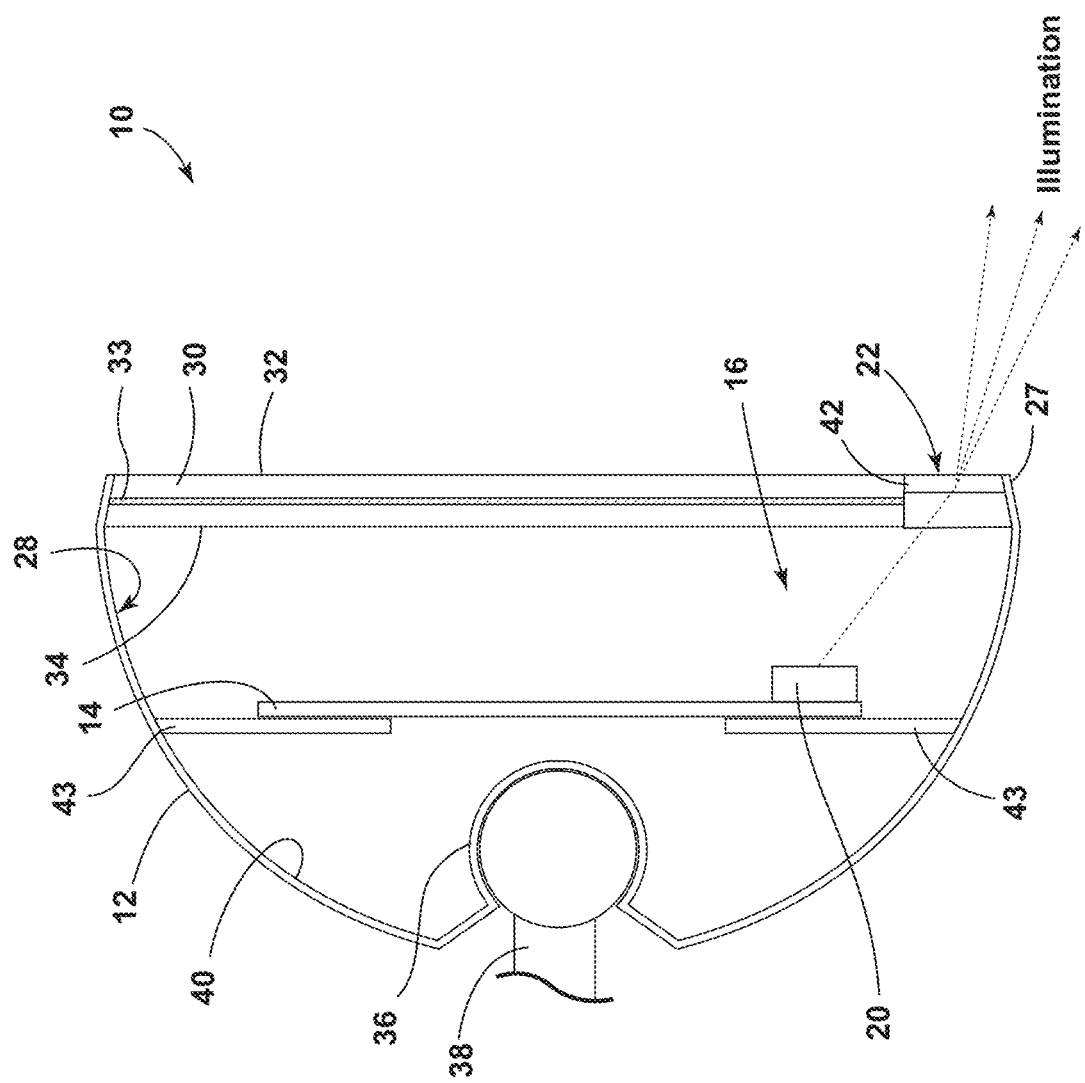
FIG. 3E is a cross-sectional side view of a rearview mirror assembly with an illumination source and an optical element in a fifth arrangement, in accordance with one aspect of the present disclosure.

With reference now to FIGS. 3C-3E, the optical element 22 may be connected directly to the transmission element 30, for example, via a wetting out process and direct adhering with an adhesive (e.g., an optical adhesive). For example, as shown in FIG. 3C, the optical element 22 may be located on a side of the front surface 32 of the transmission element 30 (e.g., connected to the front surface 32). In other embodiments, such as the arrangement shown in FIG. 3D, the optical element 22 may be located on a side of the rear surface 34 of the transmission element 30 (e.g., connected to the rear surface 34 and/or otherwise located between the rear surface 34 and the illumination source 20). In other embodiments, such as the arrangement shown in FIG. 3E, the optical element 22 may extend through a portion of the housing 12, such as a bottom edge of the bezel 27. The illumination source 20 may include two or more illumination sources 20 and the optical element 22 may include two or more optical elements 22. In some embodiments, the two or more the illumination sources 20 may be aligned with a single optical element 22. In some embodiments, each of the two or more illumination sources 20 may be aligned with a different optical element 22.

With reference now to FIGS. 1-3E, the illumination source 20 may be configured to project the light for a variety of operational principles. For example, the light source 20 may be configured to project a flood illumination (e.g., in the visible and/or infrared spectrum). In this manner, the optical element 22 may redirect and spread the food illumination to different locations around the automobile 26. In some embodiments, the light may be projected in a structured light pattern (e.g., that is at least one of redirected and/or spread by the optical element 22). The image capturing module 18 may capture images of the structure light pattern and a control system (e.g., located on the first and/or second PCB 14, 15) may be configured to extrapolate images of the structured light for two-dimensional ("2D") and/or three-dimensional ("3D") information about, for example, occupant position 24. In this manner, the rearview mirror assembly 10 (e.g., the monitoring system 16) may be utilized for driver monitoring capabilities. In addition, it should be appreciated that the illumination source 20 may be configured to project the light of other operational principles for driver monitoring within 2D or 3D space.

Figure 4A:
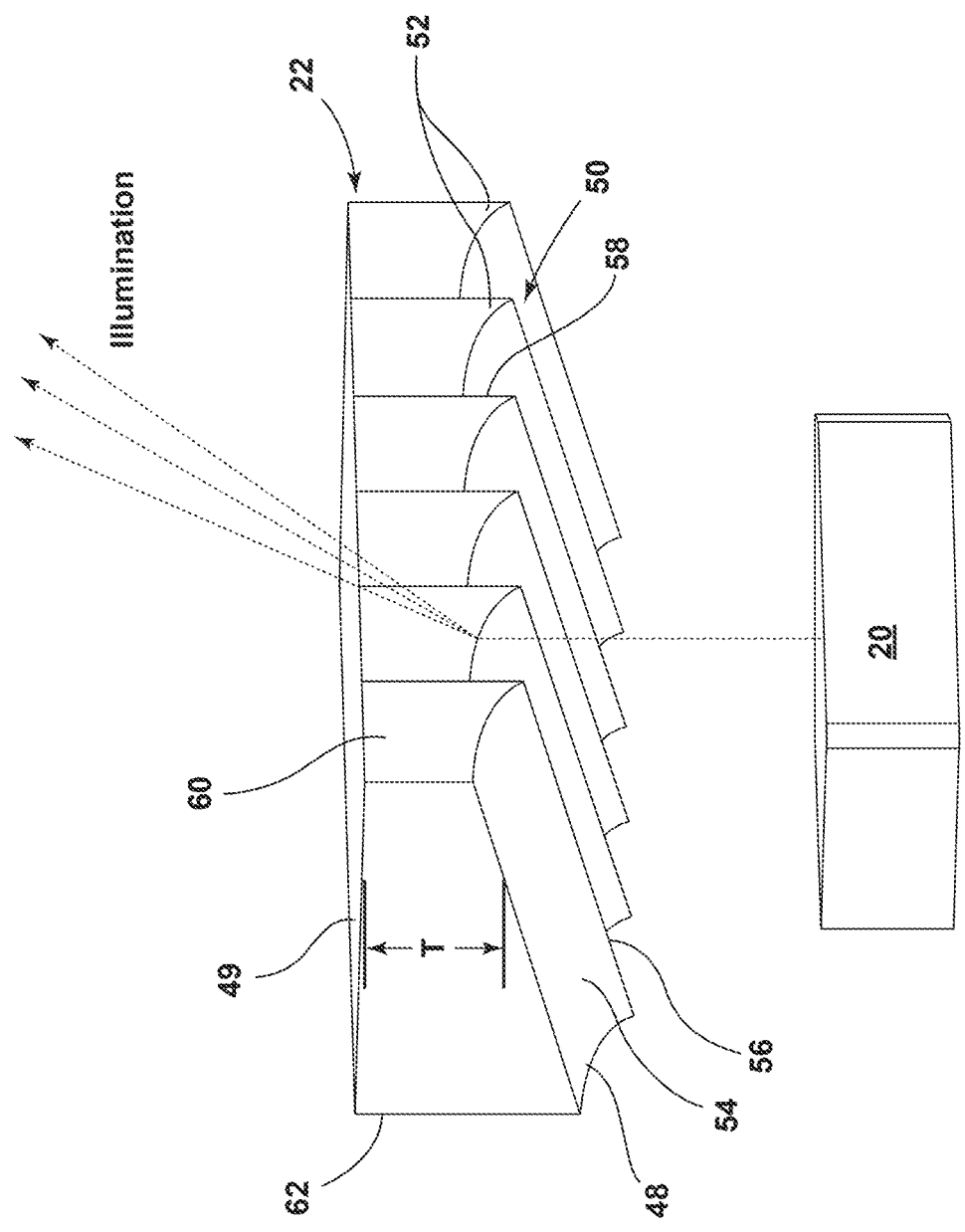
FIG. 4A is a side perspective view of an illumination source and an optical element with a first construction that redirects and spreads illumination from the illumination source, in accordance with one aspect of the present disclosure.
Figure 4B:
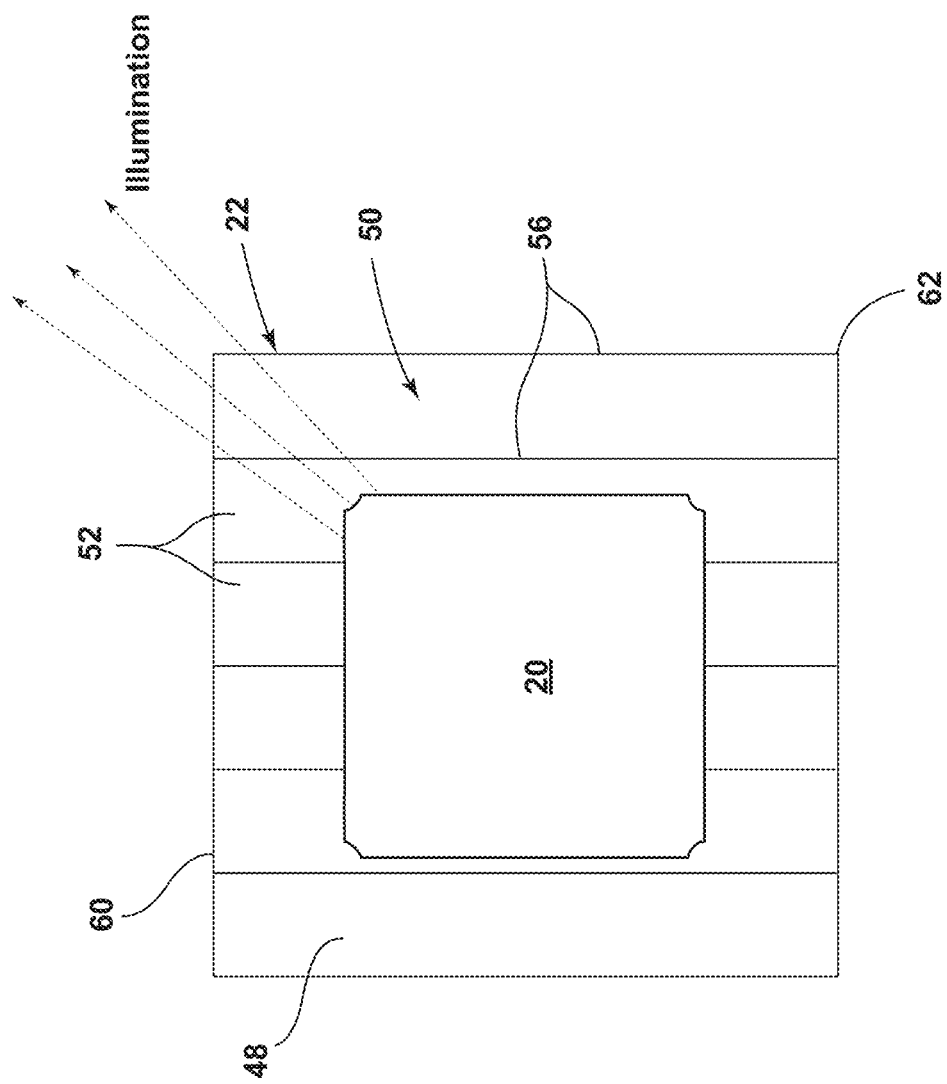
FIG. 4B is a rear view of an illumination source and an optical element with a first construction that redirects and spreads illumination from the illumination source, in accordance with one aspect of the present disclosure.

With reference now to FIGS. 4A-4B, the optical element 22 and the illumination source 20 are isolated from other components of the rearview mirror assembly 10. The optical element 22 is illustrated in accordance with a first construction. The optical element 22 includes a first major surface 48 that faces the illumination source 20 and a second major surface 49 that faces away from the illumination source 20. The first major surface 48 defines at least one refractive element 50. The at least one refractive element 50 may include a plurality of wedges 52 arranged vertically that both redirect and uniformly spread illumination from the illumination source 20 in a horizontal direction as indicated by the arrows in FIG. 4A. More particularly, each of the wedges 52 may include a slanted face 54 that extends outwardly from the first major surface 48 in a horizontal direction to an apex 56, and a cliff portion 58 may extend from the apex 56 to an adjacent wedge 52. In some embodiments, the slanted face 54 of the wedges 52 are curved (e.g., concave or convex) for concentrating or spreading the illumination. The apex 56 may also be curved (e.g., defined by a radius) and the cliff portion 58 may be angled from the apex 56 towards or away from the slanted face 54. Each wedge 52 extends across (e.g., linearly) the first major surface 48 from a top side 60 to a bottom side 62 of the optical element 22. The optical element 22 may be tapered such that one side 60, 62 is thicker ("T") than the other side 60, 62 to bend the light (i.e., illumination from the illumination source 20) vertically to redirect light in a vertical direction as indicated by the arrows in FIG. 4B. In some embodiments, the top side 60 is thinner than the bottom side 62. In this manner, the direction of taper may further bend the light in a vertically downward direction. In some embodiments, the taper may be on the first major surface 48 and the second major surface 49 may be substantially planar. In some embodiments, one of the major surfaces 48, 49 (e.g., the second major surface 49) may be curved (e.g., concave or convex) for concentrating or spreading the illumination. In some embodiments, the taper may be on the second major surface 49 and the apex 56 of each wedge 52 may extend to a plane. In some embodiments, two or more wedges 52 may each include a slanted face 54 that slopes at different pitches or exhibits different curvatures for further redirection and spreading of the light.

Figure 5A:
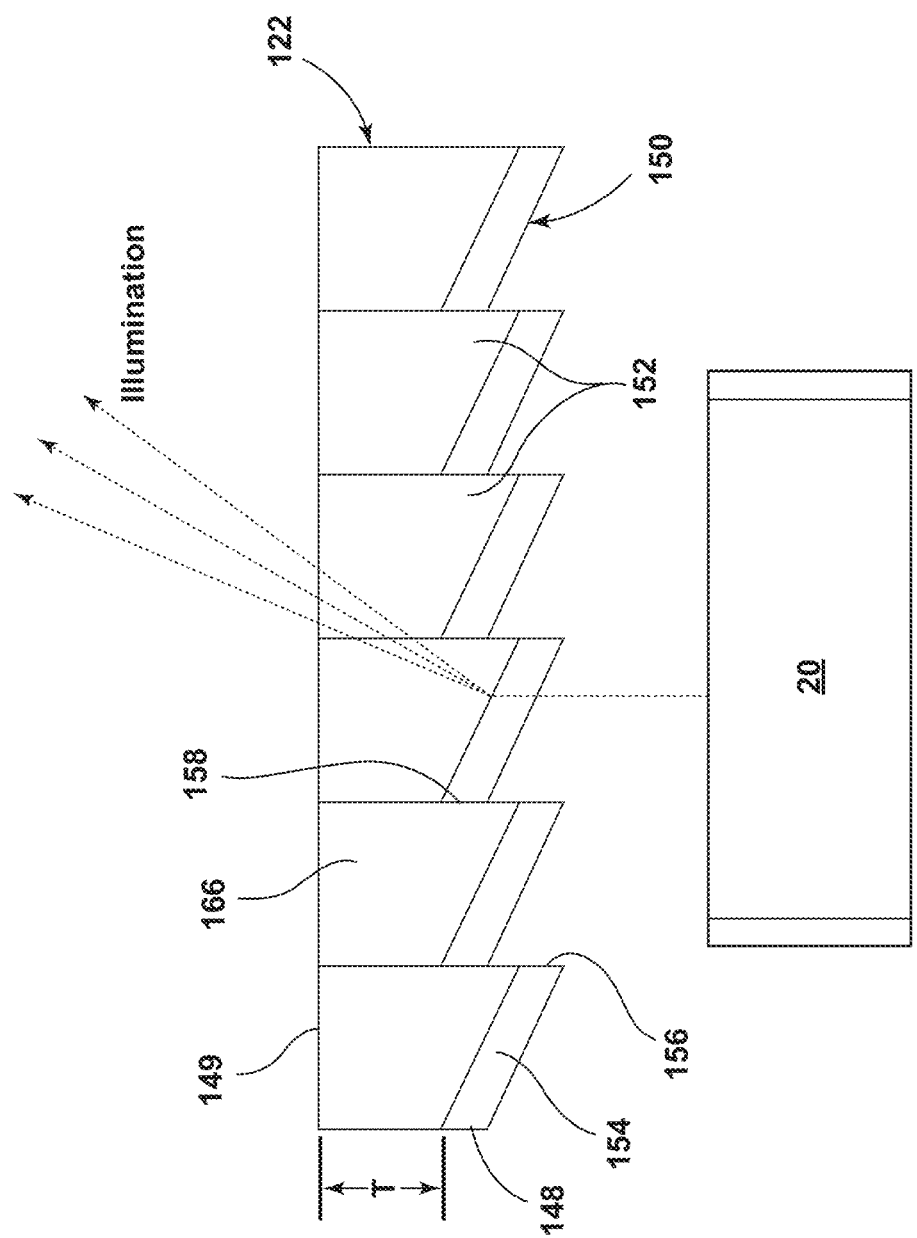
FIG. 5A is a side view of an illumination source and an optical element with a second construction that redirects and spreads illumination from the illumination source, in accordance with one aspect of the present disclosure.

With reference now to FIGS. 5A and 5B, an optical element 122 is illustrated in accordance with a second construction. Unless otherwise specified, the optical element 122 may be incorporated into at least the structure in FIG. 1 and other structures described herein. In addition, the optical element 122 may include similar features, elements, and materials as the other constructions set forth herein. More particularly, the optical element 122 includes a first major surface 148 that faces the illumination source 20 and a second major surface 149 that faces away from the illumination source 20. The first major surface 148 defines at least one refractive element 150. The at least one refractive element 150 may include a plurality of wedges 152 arranged horizontally to redirect and uniformly spread illumination from the illumination source 20 in a vertical direction as indicated by the arrows in FIG. 5A. More particularly, each of the wedges 152 may include a slanted face 154 that extends outwardly from the first major surface 148 in a vertical direction to an apex 156, and a cliff portion 158 may extend from the apex 156 to an adjacent wedge 152. In some embodiments, the slanted face 154 of the wedges 152 are curved (e.g., concave or convex) for concentrating or spreading the illumination. The apex 156 may also be curved (e.g., defined by a radius) and the cliff portion 158 may be angled from the apex 156 towards or away from the slanted face 154. Each wedge 152 extends across (e.g., linearly) the first major surface 148 from a right side 164 to a left side 166 of the optical element 122. The optical element 122 may be tapered such that one side 164, 166 is thicker ("T") than the other side 164, 166 to bend light horizontally. In some embodiments, the left side 166 is thinner than the right side 164. In this manner, the direction of taper may further bend the light in a horizontally rightward direction. In some embodiments, the taper may be on the first major surface 148 and the second major surface 149 may be substantially planar. In some embodiments, one of the major surfaces 148, 149 (e.g., the second major surface 149) may be curved (e.g., concave or convex) for concentrating or spreading the illumination. In some embodiments, the taper may be on the second major surface 149 and the apex 156 of each wedge 152 may extend to a plane. In some embodiments, two or more wedges 152 may each include a slanted face 154 that slopes at different pitches or exhibits different curvatures.

Figure 6A:
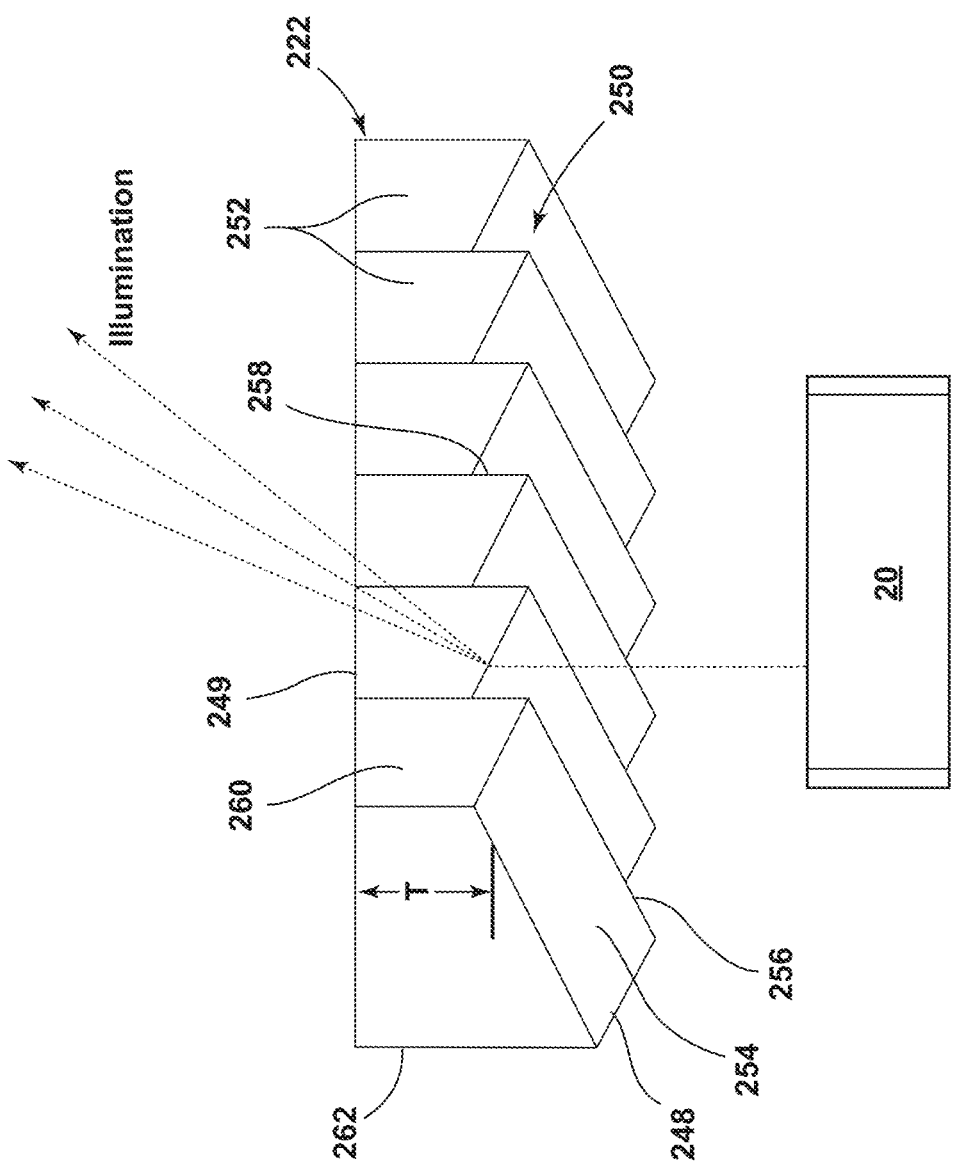
FIG. 6A is a side perspective view of an illumination source and an optical element with a third construction that redirects illumination and spreads from the illumination source, in accordance with one aspect of the present disclosure.
Figure 6B:
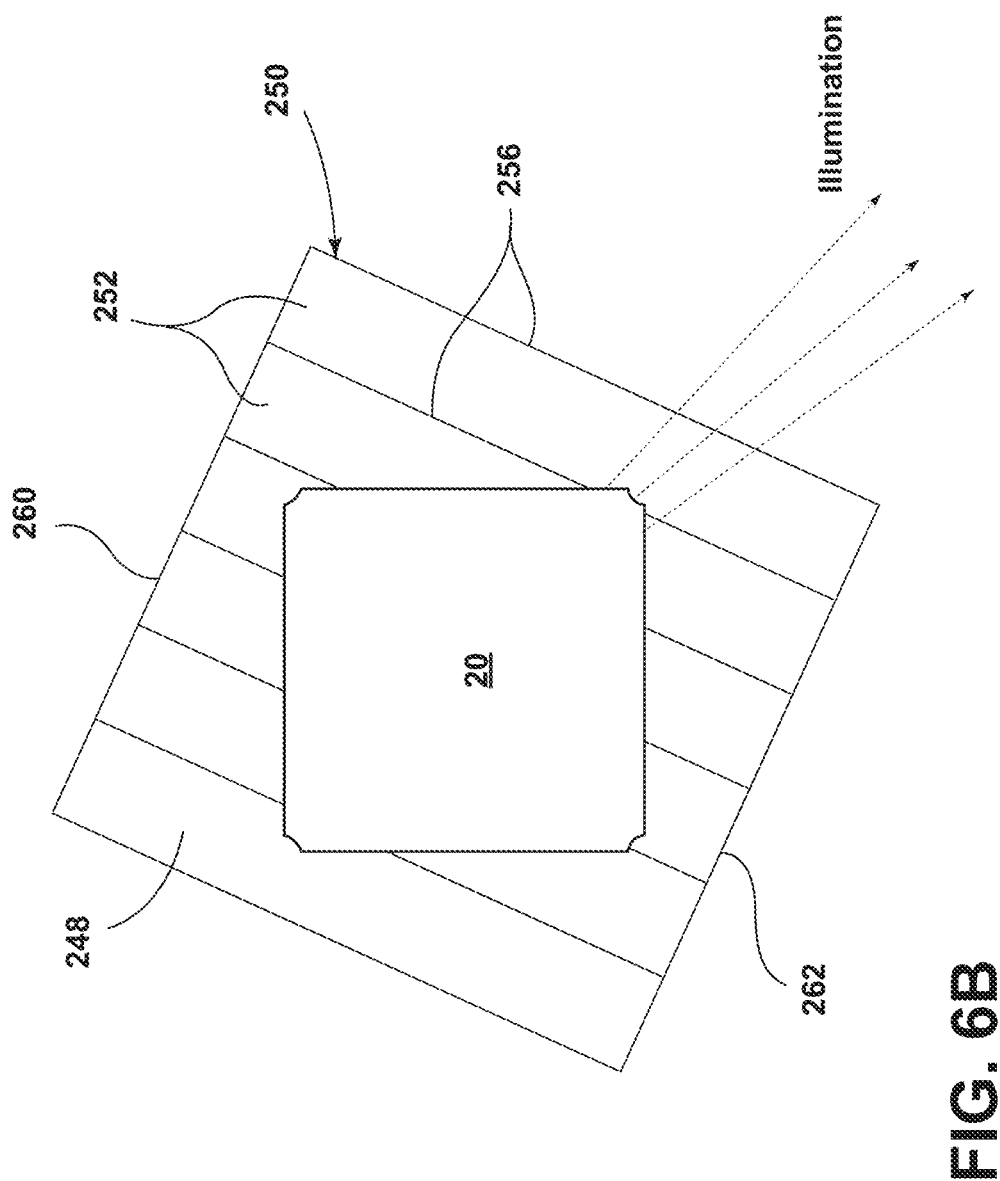
FIG. 6B is a rear view of an illumination source and an optical element with a third construction that redirects illumination and spreads from the illumination source, in accordance with one aspect of the present disclosure.

With reference now to FIGS. 6A and 6B, an optical element 222 is illustrated in accordance with a third construction. Unless otherwise specified, the optical element 222 may be incorporated into at least the structure in FIG. 1 and other structures described herein. In addition, the optical element 222 may include similar features, elements, and materials as the other constructions set forth herein. More particularly, the optical element 222 includes a first major surface 248 that faces the illumination source 20 and a second major surface 249 that faces away from the illumination source 20. The first major surface 248 defines at least one refractive element 250. The at least one refractive element 250 may include a plurality of wedges 252 arranged diagonally to redirect and uniformly spread illumination from the illumination source 20 in a diagonal (i.e., both horizontally and vertically) direction as indicated by the arrows in FIG. 6A. More particularly, each of the wedges 252 may include a slanted face 254 that extends outwardly from the first major surface 248 in a diagonal direction to an apex 256, and a cliff portion 258 may extend from the apex 256 to an adjacent wedge 252. In some embodiments, the slanted face 254 of the wedges 252 are curved (e.g., concave or convex) for concentrating or spreading the illumination. The apex 256 may also be curved (e.g., defined by a radius) and the cliff portion 258 may be angled from the apex 256 towards or away from the slanted face 254. Each wedge 252 extends across (e.g., linearly) the first major surface 248 in a direction between a top side 260 and a bottom side 262. The optical element 222 (e.g., the top side 260 and the bottom side 262) is located at an angle from the illumination source 20. In some embodiments, each wedge 252 extends across (e.g., linearly) the first major surface 248 at an angle between a top side 260 and a bottom side 262 and the top side 260 and bottom side 262 are parallel to top and bottom edges of the optical element 22. The optical element 222 may be tapered such that one side 260, 262 is thicker ("T") than the other side 260, 262 to bend light further in a diagonal direction. In some embodiments, the top side 260 is thinner than the bottom side 262. In this manner, the direction of taper may further bend the light in a diagonally downward and rightward direction as indicated by the arrows in FIG. 6B. In some embodiments, the taper may be on the first major surface 248 and the second major surface 249 may be substantially planar. In some embodiments, one of the major surfaces 248, 249 (e.g., the second major surface 249) may be curved (e.g., concave or convex) for concentrating or spreading the illumination. In some embodiments, the taper may be on the second major surface 249 and the apex 256 of each wedge 252 may extend to a plane. In some embodiments, two or more wedges 252 may each include a slanted face 254 that slopes at different pitches or exhibits different curvatures. In some embodiments, the taper may be in a diagonal direction.

Figures 7A, 7B:
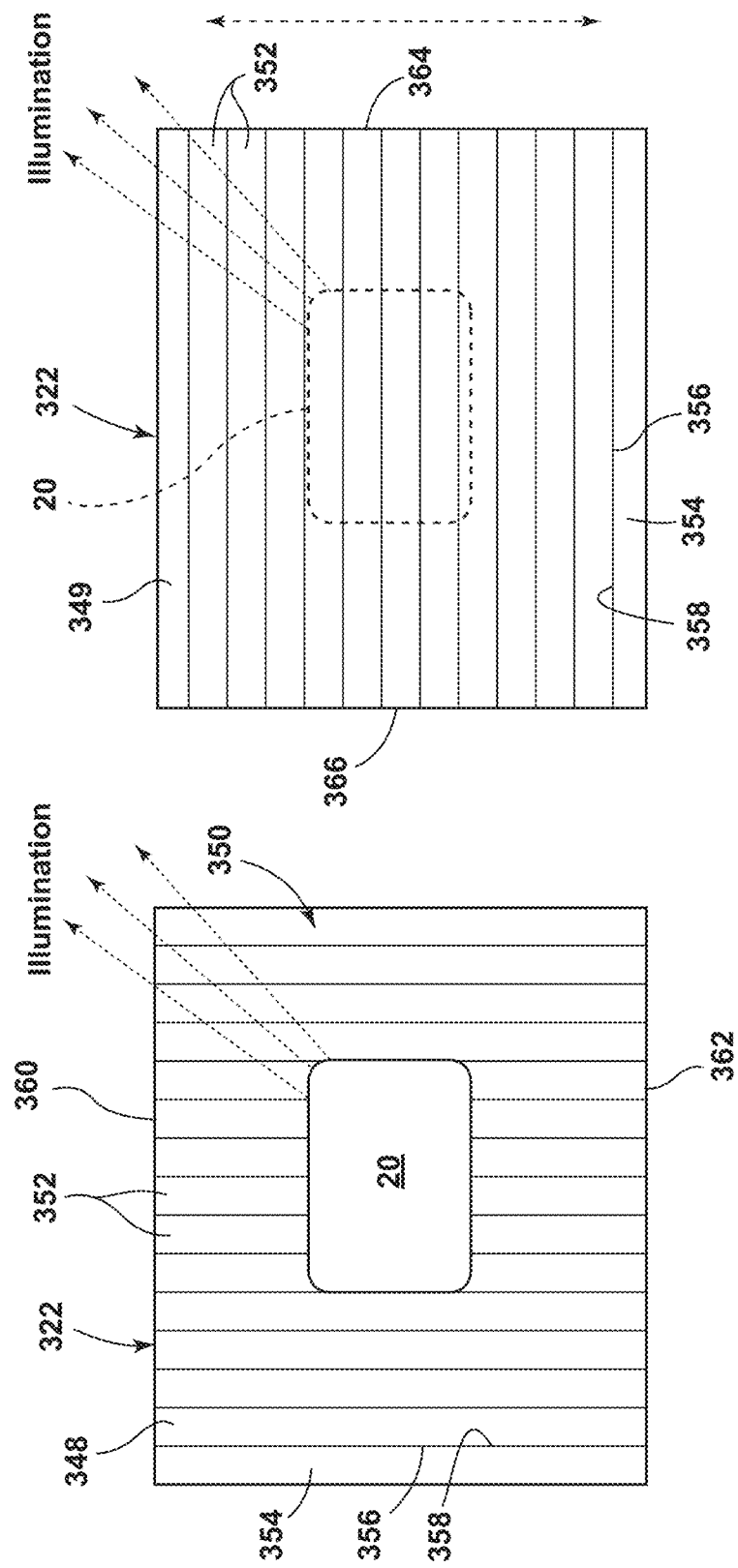
FIG. 7A is a rear view of an illumination source and an optical element with a fourth construction that redirects and spreads illumination from the illumination source, in accordance with one aspect of the present disclosure.
FIG. 7B is a front view of an illumination source and an optical element with a fourth construction that redirects and spreads illumination from the illumination source, in accordance with one aspect of the present disclosure.

With reference now to FIGS. 7A and 7B, an optical element 322 is illustrated in accordance with a fourth construction. Unless otherwise specified, the optical element 322 may be incorporated into at least the structure in FIG. 1 and other structures described herein. In addition, the optical element 322 may include similar features, elements, and materials as the other constructions set forth herein. More particularly, the optical element 322 includes a first major surface 348 that faces the illumination source 20 and a second major surface 349 that faces away from the illumination source 20. The first major surface 348 and the second major surface 349 each define at least one refractive element 350. More particularly, the at least one refractive element 350 on the first major surface 348 includes a plurality of wedges 352 arranged vertically to redirect and uniformly spread illumination from the illumination source 20 in a horizontal direction. The at least one refractive element 350 on the second major surface 349 includes a plurality of wedges 352 arranged horizontally to redirect illumination from the illumination source 20 in a vertical direction. Each of the wedges 352 may include a slanted face 354 that extends outwardly from the first major surface 348 to an apex 356, and a cliff portion 358 may extend from the apex 356 to an adjacent wedge 352. In some embodiments, the slanted face 354 of the wedges 352 are curved (e.g., concave or convex) for concentrating or spreading the illumination. The apex 356 may also be curved (e.g., defined by a radius) and the cliff portion 358 may be angled from the apex 356 towards or away from the slanted face 354. Each wedge 352 on the first major surface 348 extends across (e.g., linearly) the first major surface 348 from a top side 360 to a bottom side 362 of the optical element 322. On the other hand, each wedge 352 on the second major surface 349 extends across (e.g., linearly) the first major surface 348 from a right side 364 to a left side 366 of the optical element 322. In this manner, illumination is redirected and uniformly spread in a horizontal direction as it passes through the first major surface 348 and then is redirected and uniformly spread in a vertical direction as it passes through the second major surface 349 as indicated by the arrows in FIGS. 7A and 7B. It should be appreciated that the fourth construction can, alternatively, be more generally described as having the first major surface 348 with a refractive element 350 and a second major surface 349 with a refractive element 350 that is perpendicular to the refractive element 350 on the first major surface 348. In some embodiments, the wedges 352 on the first major surface 348 and/or the wedges 352 on the second major surface 349 may be angled relative to the sides 360, 362, 364, 366 such that the light is bent in a diagonal direction, for example, similar to the configuration in FIGS. 6A and 6B. In some embodiments, two or more wedges 352 may include a slanted face 354 that each slopes at different pitches or exhibits different curvatures.

With reference now to FIGS. 4A-7B, the pitch, curvature, size, and extension (e.g., the horizontal direction, the vertical direction, and/or the diagonal direction) of the wedges 52, 152, 252, and 352 affects the redirection of the light from the illumination source 20. Likewise, the varying thickness T may further be utilized to affect the redirection of the light from the illumination source 20. In addition, the number of wedges 52, 152, 252, and 352 affects the spread of the light from the illumination source 20. In this manner, the spread and redirection of the light can be controlled to focus the light onto areas of the automobile 26 and/or other structures of interest (e.g., the occupant location 24).

Figure 8A:
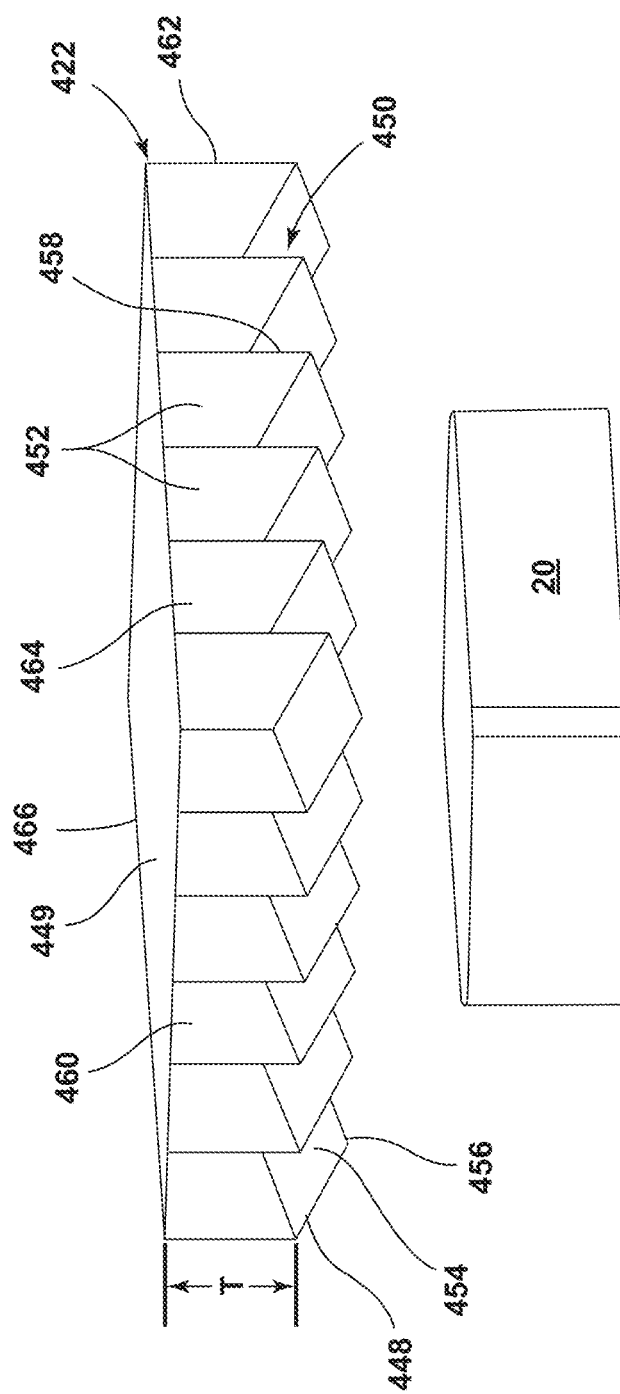
FIG. 8A is side perspective view of an illumination source and an optical element with a fifth construction that redirects illumination and spreads from the illumination source, in accordance with one aspect of the present disclosure.
Figure 8B:
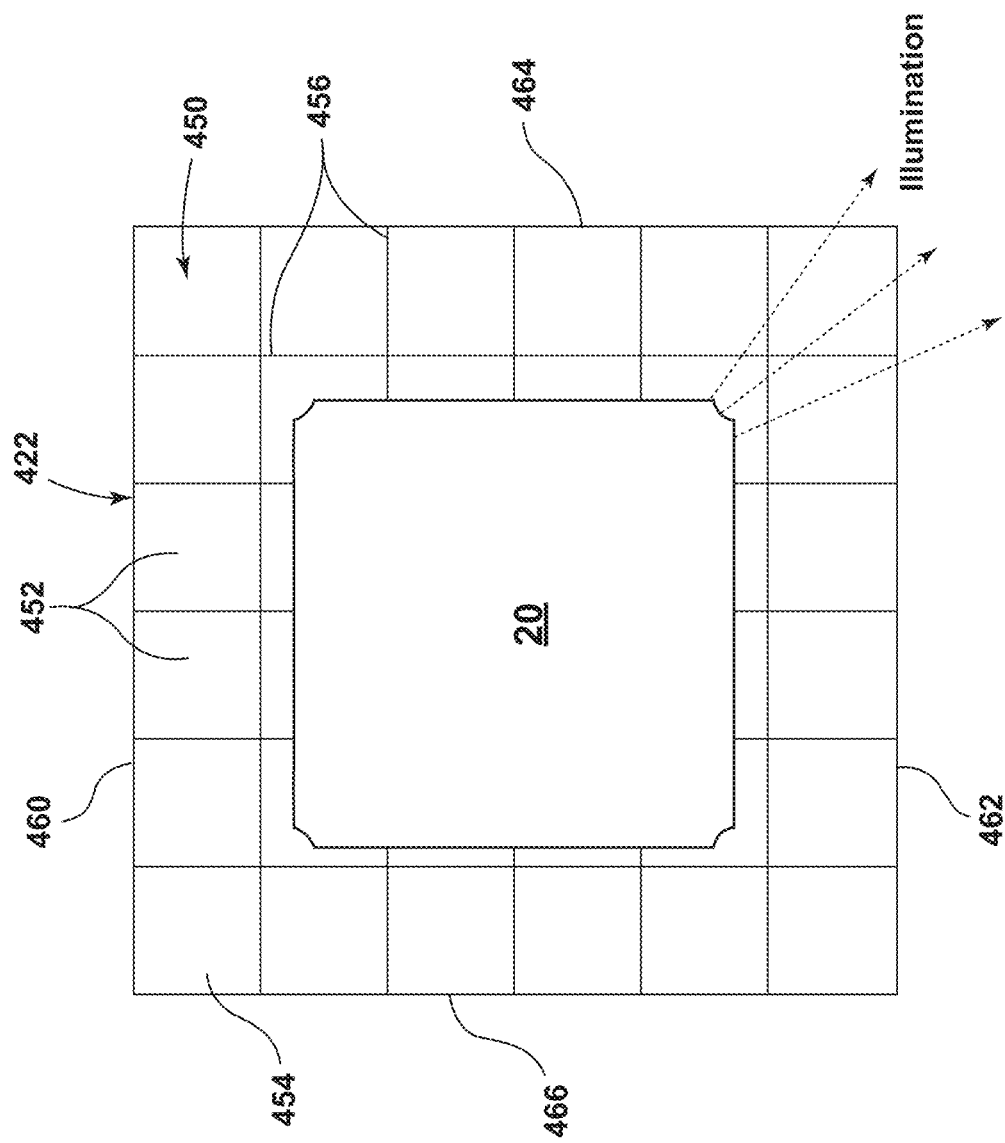
FIG. 8B is a rear view of an illumination source and an optical element with a fifth construction that redirects illumination and spreads from the illumination source, in accordance with one aspect of the present disclosure.

With reference now to FIGS. 8A and 8B, an optical element 422 is illustrated in accordance with a fifth construction. Unless otherwise specified, the optical element 422 may be incorporated into at least the structure in FIG. 1 and other structures described herein. In addition, the optical element 422 may include similar features, elements, and materials as the other constructions set forth herein. More particularly, the optical element 422 includes a first major surface 448 that faces the illumination source 20 and a second major surface 449 that faces away from the illumination source 20. The first major surface 448 defines at least one refractive element 450. The at least one refractive element 450 may include a plurality of wedges 452 arranged in a tower-grid pattern to redirect and uniformly spread illumination from the illumination source 20 in a diagonal (i.e., both horizontally and vertically) direction as indicated by the arrows in FIG. 8B. More particularly, each of the wedges 452 may include a diagonally slanted face 454 that extends outwardly from the first major surface 448 in a diagonal direction to an apex 456, and a cliff portion 458 may extend from the apex 456 to an adjacent wedge 452. Each wedge 452 extends only partially across the first major surface 448 in the tower-grid pattern. In some embodiments, the slanted face 454 of the wedges 452 are curved (e.g., concave or convex) for concentrating or spreading the illumination. The apex 456 may also be curved (e.g., defined by a radius) and the cliff portion 458 may be angled from the apex 456 towards or away from the slanted face 454. The optical element 422 may be tapered such that one of a top side 460, a bottom side 462, a right side 464, or a left side 466 is thicker ("T") than an opposite side 460, 462, 464, 466 to bend light further in a direction (e.g., diagonally, horizontally, or vertically). In some embodiments, the taper may be on the first major surface 448 and the second major surface 449 may be substantially planar. In some embodiments, one of the major surfaces 448, 449 (e.g., the second major surface 449) may be curved (e.g., concave or convex) for concentrating or spreading the illumination. In some embodiments, the taper may be on the second major surface 449 and the apex 456 of each wedge 452 may extend to a plane. In some embodiments, at least two of the wedges 452 each include a slanted face 454 extending in different directions, slope at a different pitch, and/or exhibit different curvatures.

Figure 9:
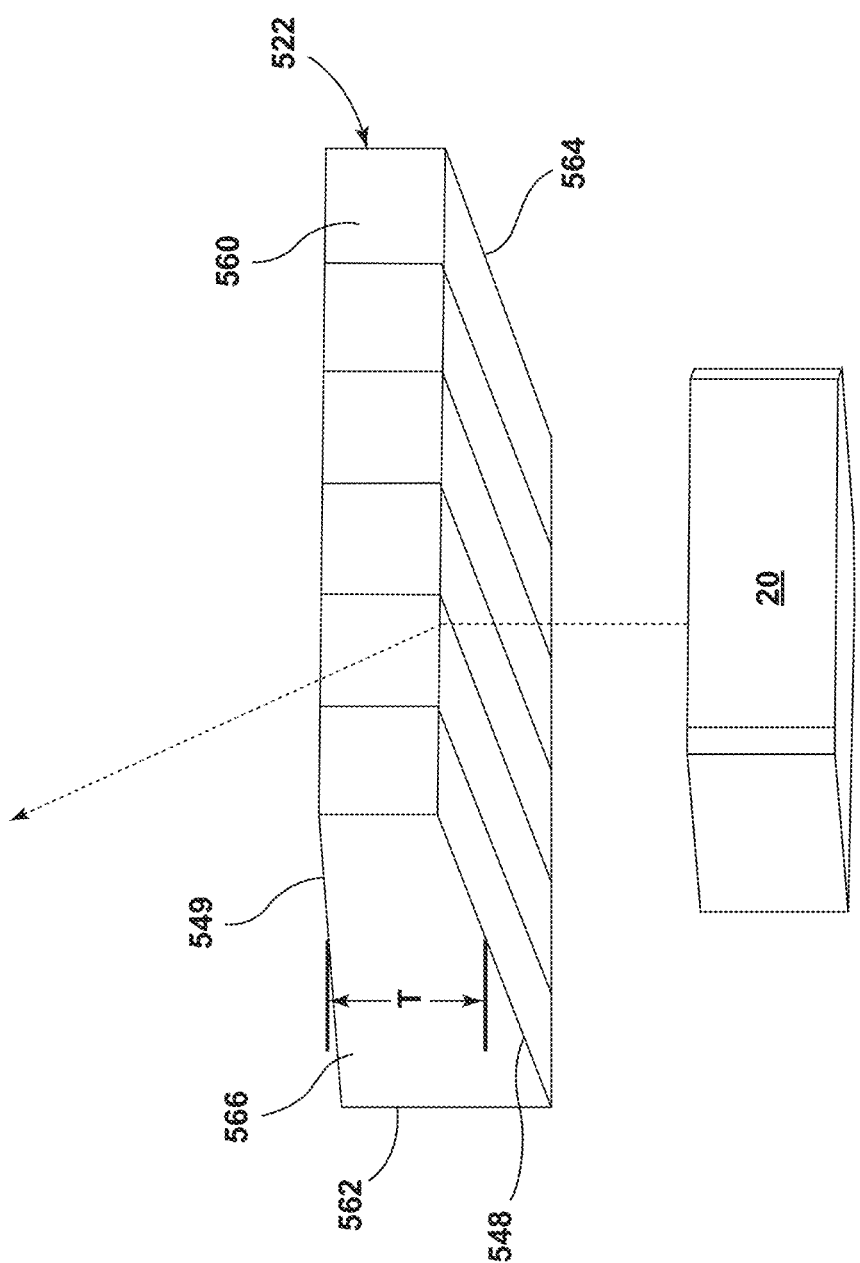
FIG. 9 is a side perspective view of an illumination source and an optical element with a sixth construction that redirects illumination and spreads from the illumination source, in accordance with one aspect of the present disclosure.

With reference now to FIG. 9, an optical element 522 is illustrated in accordance with a sixth construction. Unless otherwise specified, the optical element 522 may be incorporated into at least the structure in FIG. 1 and other structures described herein. In addition, the optical element 522 may include similar features, elements, and materials as the other constructions set forth herein. More particularly, the optical element 522 includes a first major surface 548 that faces the illumination source 20 and a second major surface 549 that faces away from the illumination source 20. The optical element 522 may be tapered such that one of a top side 560, a bottom side 562, a right side 564, or a left side 566 is thicker ("T") than an opposite side 560, 562, 564, 566 to redirect light in a direction (e.g., diagonally, horizontally, or vertically). In some embodiments, the taper may be on the first major surface 548 and the second major surface 549 may be substantially planar. In some embodiments, one of the major surfaces 548, 549 (e.g., the second major surface 549) may be curved (e.g., concave or convex) for concentrating or spreading the illumination. In some embodiments, the taper may be on the second major surface 549 and may be substantially planar or curved (e.g., convex or concave). The fifth construction may not include any wedges. In some embodiments, the taper may be in a diagonal direction.

With reference now to each of the constructions illustrated in FIGS. 1-9, the optical elements 22, 122, 222, 322, 422, 522 may be formed of a material configured to transmit infrared light. For example, the material may include at least one of polycarbonate, silicon, or acrylic. The material may further include an additive that is configured to absorb light outside of the infrared spectrum. For example, the additive may include a dye, dye pellets, and/or a film that absorbs wavelengths outside of the infrared spectrum. In this manner, the optical element 22, 122, 222, 322, 422, 522 may be substantially opaque outside of the illumination spectrum (e.g., infrared or near-infrared) to reduce and/or prevent red glow of the illumination. The monitoring system 16 and the transmission element 30 (e.g., electro-activating the electro-optic medium 33) may operate from a single PCB (e.g., the first or the second PCB 14, 15). With reference now to FIGS. 4A-8B, the wedges 52, 152, 252, 352, 452 may be provided for reducing the overall thickness T requirements of the optical elements 22, 122, 222, 322, 422 under the principles of the Fresnel lens. More particularly, the wedges 52, 152, 252, 352, 452 divides the optical elements 22, 122, 222, 322, 422 to a plurality of sections. In some embodiments, the wedges 52, 152, 252, 352, 452 are uniform for simplifying manufacturing.

It should also be appreciated that the disclosure is not strictly limited to the various constructions of the optical elements 22, 122, 222, 322, 422, 522 described herein. For example, in some embodiments, the wedge patterns (FIGS. 4A-6B and 8A) may be located on a second major surface rather than a first major surface. Likewise, various additional constructions may be implemented that include a first major surface with one of the wedge patterns (FIGS. 4A-6B and 8A) and a second major surface with the same or a different one of the wedge patterns (FIGS. 4A-6B and 8A). In addition, the taper of thickness T may be modified (e.g., diagonally, horizontally, or vertically) in any of the constructions in order to redirect light in a diagonal (e.g., upward and leftward, downward and leftward, upward and rightward, downward and rightward), horizontal (e.g., leftward or rightward), or vertical (e.g., upward or downward) direction as needed. The taper may be located on the first major surface 48, 148, 248, 348, 448, and 548 or the second major surface 49, 149, 249, 349, 449, and 549. It should be appreciated that light will be directed in a direction of the thicker part of the taper and or wedge 52, 152, 252, 352, and 448. Accordingly, various constructions may be defined as having a first wedge pattern on a first major surface that is configured to redirect and spread light uniformly in a diagonal (e.g., upward and leftward, downward and leftward, upward and rightward, downward and rightward), horizontal (e.g., leftward or rightward), or vertical (e.g., upward or downward) direction. Similarly, various constructions may be defined as having a second wedge pattern on a second major surface that is configured to redirect and spread light uniformly in a diagonal (e.g., upward and leftward, downward and leftward, upward and rightward, downward and rightward), horizontal (e.g., leftward or rightward), or vertical (e.g., upward or downward) direction. Generally speaking, light will be directed in a direction of the apex of the wedge. In some embodiments, various constructions may include a first wedge pattern on a first major surface, a second wedge pattern on a second major surface, and a taper in a horizontal, vertical, or diagonal direction. In some embodiments, various constructions may include a wedge pattern on a first major surface, a planar second major surface, and a taper. In some embodiments, various constructions may include a planar first major surface, a wedge pattern on a second major surface, and a taper as described herein. In some embodiments, various constructions may include a taper on the first and/or second major surface.

The disclosure herein is further summarized in the following paragraphs and is further characterized by combinations of any and all of the various aspects described therein.

According to one aspect, a rearview mirror assembly includes a housing and a printed circuit board (PCB) located in the housing. The rearview mirror assembly further includes a monitoring system that includes an image capturing module, an illumination source connected to the PCB, and an optical element aligned with the illumination source. The optical element is configured to redirect and spread an illumination from the illumination source toward an occupant position in an automobile.

According to another aspect, an image capturing module is located in a housing.

According to yet another aspect, a connection body connects an optical element to a PCB in a spaced relationship from an illumination source.

According to another aspect, a connection body includes a pair of pins extending from an optical element to a PCB According to yet another aspect, a connection body includes a pair of clips extending from an optical element to a PCB.

According to another aspect, an optical element includes a first major surface facing an illumination source and a second major surface facing away from the illumination source.

According to yet another aspect, a first major surface of an optical element defines at least one refractive element.

According to another aspect, at least one refractive element includes a plurality of wedges arranged vertically to redirect and spread the illumination in a horizontal direction.

According to yet another aspect, at least one refractive element includes a plurality of wedges arranged horizontally to redirect and spread the illumination in a vertical direction.

According to another aspect, at least one refractive element includes a plurality of wedges arranged diagonally to redirect and spread the illumination in a horizontal direction and a vertical direction.

According to yet another aspect, a transmission element is located in a housing and transmits an illumination therethrough into an automobile and a second major surface of an optical element is directly adhered to the transmission element.

According to another aspect, at least one refractive element includes a first plurality of wedges arranged in at least one of a vertical or horizontal orientation and a second major surface defines at least one second refractive element including a second plurality of wedges arranged perpendicular to the first plurality of wedges on the first major surface.

According to yet another aspect, an optical element is formed of at least one of polycarbonate, silicon, or acrylic.

According to another aspect, the optical element includes at least one additive configured to absorb light outside of the infrared spectrum.

According to yet another aspect, an illumination source is configured to transmit infrared light.

According to another aspect of the present disclosure, a rearview mirror assembly includes a housing, a transmission element at least partially located in the housing, and a printed circuit board (PCB) located in the housing. The rearview mirror assembly further includes a monitoring system that includes an image capturing module, an illumination source connected to the PCB, and an optical element aligned with the illumination source that includes a plurality of wedges each extending to an apex. The plurality of wedges is configured to redirect and spread an illumination from the illumination source toward an occupant position in an automobile.

According to another aspect, the plurality of wedges is arranged in a tower-grid pattern.

According to yet another aspect, a connection body connects an optical element to a PCB in a spaced relationship from an illumination source.

According to yet another aspect of the present disclosure, a rearview mirror assembly includes a housing and a printed circuit board (PCB) located in the housing. The rearview mirror assembly further includes a monitoring system that includes an image capturing module, an illumination source connected to the PCB, and an optical element aligned with the illumination source. The optical element is configured to redirect and spread an illumination from the illumination source toward an occupant position in an automobile. A connection body connects the optical element in a spaced relationship from the illumination source.

According to another aspect, a connection body is configured to connect an optical element to one of a PCB, a housing, or a transmission element.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:
1. A rearview mirror assembly comprising:
a housing;
a printed circuit board (PCB) located in the housing;
a monitoring system comprising:
  an image capturing module;
  an illumination source connected to the PCB; and
  an optical element aligned with the illumination source extending between a first side and a second side that includes a plurality of wedges extending linearly between the first side and the second side, each of the plurality of wedges including a slanted face extending in a curved profile from a bottom edge to an apex and configured to redirect and spread an illumination from the illumination source toward an occupant position in an automobile.
2. The rearview mirror assembly of claim 1, wherein the plurality of wedges are uniformly spaced between the first side to the second side.
3. The rearview mirror assembly of claim 1, further including a connection body directly connecting to the optical element and to the PCB, the PCB in a spaced relationship from the illumination source.
4. The rearview mirror assembly of claim 3, wherein the connection body includes a pair of pins extending from a pair of apertures in the optical element to the PCB.
5. The rearview mirror assembly of claim 3, wherein the connection body includes a pair of pins extending from a pair of apertures in the PCB to the optical element.
6. The rearview mirror assembly of claim 1, wherein the optical element includes a first major surface facing the illumination source and a second major surface facing away from the illumination source and the plurality of wedges are located on the first major surface.
7. The rearview mirror assembly of claim 6, wherein the plurality of wedges extend substantially entirely across the first major surface between the first side and the second side.
8. The rearview mirror assembly of claim 7, wherein the plurality of wedges arranged vertically relative to the illumination source and the housing to redirect and spread the illumination in a horizontal direction relative to the housing.
9. The rearview mirror assembly of claim 7, wherein the plurality of wedges arranged horizontally relative to the illumination source and the housing to redirect and spread the illumination in a vertical direction relative to the housing.
10. The rearview mirror assembly of claim 7, wherein the plurality of wedges arranged diagonally relative to the illumination source and the housing to redirect and spread the illumination in a horizontal direction and a vertical direction relative to the housing.
11. The rearview mirror assembly of claim 7, wherein the plurality of wedges includes a first plurality of wedges arranged on the first major surface in at least one of a vertical or horizontal orientation for directing the illumination in a first direction and a second plurality of wedges arranged on the second major surface that are perpendicular to the first plurality of wedges on the first major surface for directing the illumination in a second direction that is different than the first direction.
12. The rearview mirror assembly of claim 6, wherein the curved profile of each slanted face has the same orientation.
13. The rearview mirror assembly of claim 1, wherein the optical element is formed of at least one of polycarbonate, silicon, or acrylic.
14. The rearview mirror assembly of claim 13, wherein the optical element includes at least one additive configured to absorb light outside of the infrared spectrum.
15. The rearview mirror assembly of claim 14, wherein the illumination source is configured to transmit infrared light.
16. A rearview mirror assembly comprising:
a housing;
a printed circuit board (PCB) located in the housing;
a monitoring system comprising:
  an image capturing module;
  an illumination source connected to the PCB;
  an optical element aligned with the illumination source that includes a plurality of wedges each including a slanted face extending from a bottom edge to an apex, the plurality of wedges configured to redirect and spread an illumination from the illumination source toward an occupant position in an automobile;
  at least one pin extends directly between the PCB to the optical element; and wherein the slanted faces of the plurality of wedges each extend in a same curved profile from the bottom edge to the apex.

17. The rearview mirror assembly of claim 16, wherein at least one pin extends from an aperture defined by the PCB to the optical element.

18. A rearview mirror assembly comprising:
- a housing;
- a transmission element at least partially located in the housing;
- a printed circuit board (PCB) located in the housing;
- a monitoring system comprising:
  - an image capturing module;
  - an illumination source connected to the PCB;
  - an optical element aligned with the illumination source configured to redirect an infrared illumination from the illumination source and substantially uniformly spread the infrared illumination toward an occupant position in an automobile; and wherein the optical element includes a plurality of wedges extending linearly between a first side and a second side, each of the plurality of wedges including a slanted face extending in a curved profile from a bottom edge to an apex.

* * * * *